US010175677B2

(12) United States Patent
Yamaguchi (10) Patent No.: US 10,175,677 B2
(45) Date of Patent: Jan. 8, 2019

(54) NUMERICAL CONTROLLER

(71) Applicant: FANUC Corporation, Minamitsuru-gun, Yamanashi (JP)

(72) Inventor: Takehiro Yamaguchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 190 days.

(21) Appl. No.: 14/972,774

(22) Filed: Dec. 17, 2015

(65) Prior Publication Data

US 2016/0179083 A1   Jun. 23, 2016

(30) Foreign Application Priority Data

Dec. 19, 2014   (JP) ................................. 2014-257534

(51) Int. Cl.
    *G05B 19/408*   (2006.01)
    *G05B 19/425*   (2006.01)

(52) U.S. Cl.
    CPC ....... *G05B 19/4083* (2013.01); *G05B 19/425* (2013.01); *G05B 2219/36442* (2013.01); *G05B 2219/42129* (2013.01); *Y02P 90/265* (2015.11)

(58) Field of Classification Search
    CPC ............ G05B 19/4083; G05B 19/425; G05B 19/402; G05B 19/40937; G05B 19/4155;
    (Continued)

(56) References Cited

U.S. PATENT DOCUMENTS 5,980,082 A * 11/1999 Watanabe ............. B25J 9/1658
                                                        700/86
1,754,665 A1    3/2006 Nagatsuka et al.
                (Continued)

FOREIGN PATENT DOCUMENTS

CN            1754665 A      4/2006
CN          102004485 A      4/2011
                (Continued)

OTHER PUBLICATIONS

Shin et al. (Choonsung Shin, Jin-Kyuk Hong, Anind K. Dey, Carnegie Mellon University, Understanding and Prediction of Mobile Application Usage for Smart Phones, UbiComp'12, Sep. 5-8, 2012, Pittsburgh, USA. Copyright 2012 ACM 978-1-4503-1224-0/12/09).*

(Continued)

*Primary Examiner* — Kenneth M Lo
*Assistant Examiner* — Michael W Choi
(74) *Attorney, Agent, or Firm* — Drinker Biddle & Reath LLP (57) ABSTRACT

A numerical controller including an automatic display unit of a teach program includes a manual movement axis monitor unit for monitoring whether there is an axis moved by manual feed, a teach target program selection and determination unit for selecting and determining a teach program controlling the axis, and a teach block selection and determination unit for selecting and determining a teach point from a movement direction of the axis, and selecting and determining, as a teach block, a block in the teach program in which the teach point is an end point.

14 Claims, 11 Drawing Sheets

(58) Field of Classification Search
CPC .. G05B 19/19; G05B 19/409; G05B 19/4103; G05B 19/4069; G05B 19/4068; Y02P 90/265
USPC .......................................................... 700/47
See application file for complete search history.

(56) References Cited

U.S. PATENT DOCUMENTS

| | | | |
|---|---|---|---|
| 2003/0069683 A1* | 4/2003 | Lapidot | G01C 21/34 701/117 |
| 2004/0186627 A1* | 9/2004 | Watanabe | G05B 19/402 700/264 |
| 2005/0222714 A1* | 10/2005 | Nihei | G05B 19/423 700/264 |
| 2005/0283269 A1 | 12/2005 | Genma et al. | |
| 2006/0271240 A1* | 11/2006 | Nihei | B25J 9/1664 700/245 |
| 2006/0276934 A1* | 12/2006 | Nihei | B25J 9/1656 700/245 |
| 2007/0187367 A1* | 8/2007 | Kita | B23H 7/26 219/69.11 |
| 2011/0054685 A1 | 3/2011 | Wada | |
| 2014/0135986 A1* | 5/2014 | Kanehara | B25J 9/1671 700/257 |
| 2016/0179083 A1* | 6/2016 | Yamaguchi | G05B 19/4083 700/47 |

FOREIGN PATENT DOCUMENTS

| | | |
|---|---|---|
| CN | 102950595 A | 3/2013 |
| JP | H02-64715 A | 3/1990 |
| JP | H05-134738 A | 6/1993 |
| JP | 2003-308115 A | 10/2003 |
| JP | 2006-004275 A | 1/2006 |
| JP | 2010-052106 A | 3/2010 |
| JP | 2010-131705 A | 6/2010 |

OTHER PUBLICATIONS

Notification of Reasons for Refusal dated Oct. 11, 2016 in Japanese Patent Application No. 2014-257534 (2 pages) with an English Translation (2 pages).
The Notification of the First Office Action dated Nov. 29, 2017 in Chinese Patent Application No. 2015109650550 (6 pages) with an English translation (9 pages).

* cited by examiner

MANUAL MOVEMENT DATA TABLE

| STEP | AXIS NAME | MOVEMENT DIRECTION | CURRENT POSITION |
|---|---|---|---|
| 1 | Y | + | 30.000 |
| 2 | X | + | 60.000 |
| 3 | Y | + | 60.000 |

FIG. 3

AXIS SYSTEM ASSOCIATION TABLE

| AXIS NAME | SYSTEM TO WHICH AXIS BELONGS |
|---|---|
| X | 1 |
| Y | 1 |
| Z | 1 |
| A | 2 |
| B | 2 |
| C | 2 |

FIG. 4
PROGRAM MANAGEMENT TABLE

| SYSTEM | PROGRAM | AXES WHICH BELONG TO PROGRAM | END POINT COORDINATE | FREQUENCY OF USE | LAST USE FLAG |
|---|---|---|---|---|---|
| 1 | O1;<br>N1G00G90X0Y0;<br>N2X110;<br>N3Y100;<br>N4X0;<br>N5Y0;<br>M99; | X,Y | (X,Y)<br>N1(0,0)<br>N2(110,0)<br>N3(110,100)<br>N4(0,100)<br>N5(0,0) | 10 | 1 |
| 1 | O2;<br>N1G00G90X0Y0;<br>N2X50;<br>N3Y50;<br>N4X0Y0;<br>M99; | X,Y | (X,Y)<br>N1(0,0)<br>N2(50,0)<br>N3(50,50)<br>N4(0,0) | 2 | 0 |
| 1 | O3;<br>N1G00G90Z0;<br>N2Z100;<br>N3Z0;<br>M99; | Z | (Z)<br>N1(0)<br>N2(100)<br>N3(0) | 2 | 0 |
| 2 | O1001;<br>N1G00G90A0,B0;<br>N2A100,B-50;<br>N3A50,B50;<br>N4A0,B0;<br>M99; | A,B | (A,B)<br>N1(0,0)<br>N2(100,-50)<br>N3(50,50)<br>N4(0,0) | 5 | 1 |
| 2 | O1002;<br>N1G00G90C0;<br>N2C100;<br>N3C0;<br>M99; | C | (C)<br>N1(0)<br>N2(100)<br>N3(0) | 50 | 0 |

FIG. 5A

| AXIS NAME | MOVEMENT DIRECTION |
|---|---|
| <1> | (0,0) |
| <2> | (110,0) |
| <3> | (110,100) |
| <4> | (0,100) |

FIG. 5B

| AXIS NAME | MOVEMENT DIRECTION |
|---|---|
| <5> | (0,0) |
| <6> | (100,-50) |
| <7> | (50,50) |

| STEP | AXIS NAME | POSc | POSp | Diff (SIGN) |
|---|---|---|---|---|
| 1 | Y | 30.000 | 0.000 | 30.000(+) |
| 2 | X | 60.000 | 30.000 | 30.000(+) |
| 3 | Y | 60.000 | 30.000 | 30.000(+) |

FIG. 12A
[STEP 1]

X AXIS

| | PREVIOUS | CURRENT | DIFFERENCE |
|---|---|---|---|
| DIFFERENCE FROM ⟨1⟩ | 30 | 30 | 0 |
| DIFFERENCE FROM ⟨2⟩ | −70 | −70 | 0 |
| DIFFERENCE FROM ⟨3⟩ | −70 | −70 | 0 |
| DIFFERENCE FROM ⟨4⟩ | 30 | 30 | 0 |

FIG. 12B

Y AXIS

| | PREVIOUS | CURRENT | DIFFERENCE | STATE |
|---|---|---|---|---|
| DIFFERENCE FROM ⟨1⟩ | 0 | 30 | 30(⟨1⟩<POSc) | MOVING AWAY FROM ⟨1⟩ |
| DIFFERENCE FROM ⟨2⟩ | 0 | 30 | 30(⟨2⟩<POSc) | MOVING AWAY FROM ⟨2⟩ |
| DIFFERENCE FROM ⟨3⟩ | −100 | −70 | 30(⟨3⟩>POSc) | APPROACHING ⟨3⟩ |
| DIFFERENCE FROM ⟨4⟩ | −100 | −70 | 30(⟨4⟩>POSc) | APPROACHING ⟨4⟩ |

FIG. 13A

[STEP 2]

| X AXIS | PREVIOUS | CURRENT | DIFFERENCE | STATE |
|---|---|---|---|---|
| DIFFERENCE FROM ⟨1⟩ | 30 | 60 | 30(⟨1⟩<POSc) | MOVING AWAY FROM ⟨1⟩ |
| DIFFERENCE FROM ⟨2⟩ | −70 | −40 | 30(⟨2⟩>>POSc) | APPROACHING ⟨2⟩ |
| DIFFERENCE FROM ⟨3⟩ | −70 | −40 | 30(⟨3⟩>>POSc) | APPROACHING ⟨3⟩ |
| DIFFERENCE FROM ⟨4⟩ | 30 | 60 | 30(⟨4⟩<POSc) | MOVING AWAY FROM ⟨4⟩ |

FIG. 13B

| Y AXIS | PREVIOUS | CURRENT | DIFFERENCE |
|---|---|---|---|
| DIFFERENCE FROM ⟨1⟩ | 30 | 30 | 0 |
| DIFFERENCE FROM ⟨2⟩ | 30 | 30 | 0 |
| DIFFERENCE FROM ⟨3⟩ | −70 | −70 | 0 |
| DIFFERENCE FROM ⟨4⟩ | −70 | −70 | 0 |

FIG. 14A
[STEP 3]

| X AXIS | PREVIOUS | CURRENT | DIFFERENCE |
|---|---|---|---|
| DIFFERENCE FROM ⟨1⟩ | 60 | 60 | 0 |
| DIFFERENCE FROM ⟨2⟩ | -40 | -40 | 0 |
| DIFFERENCE FROM ⟨3⟩ | -40 | -40 | 0 |
| DIFFERENCE FROM ⟨4⟩ | 60 | 60 | 0 |

FIG. 14B

| Y AXIS | PREVIOUS | CURRENT | DIFFERENCE | STATE |
|---|---|---|---|---|
| DIFFERENCE FROM ⟨1⟩ | 30 | 60 | 30(⟨1⟩<POSc) | MOVING AWAY FROM ⟨1⟩ |
| DIFFERENCE FROM ⟨2⟩ | 30 | 60 | 30(⟨2⟩<POSc) | MOVING AWAY FROM ⟨2⟩ |
| DIFFERENCE FROM ⟨3⟩ | -70 | -40 | 30(⟨3⟩>>POSc) | APPROACHING ⟨3⟩ |
| DIFFERENCE FROM ⟨4⟩ | -70 | -40 | 30(⟨4⟩>>POSc) | APPROACHING ⟨4⟩ |

NUMERICAL CONTROLLER

RELATED APPLICATION DATA

This application claims priority under 35 U.S.C. § 119 and/or § 365 to Japanese Application No. 2014-257534 filed Dec. 19, 2014, the entire contents is incorporated herein by reference.

BACKGROUND OF THE INVENTION

1. Field of the Invention

The present invention relates to a numerical controller, and more particularly, to a numerical controller capable of reducing a work time for selecting a teach target when there are many teach targets in teach operation.

2. Description of the Related Art

When a teach operation is performed to generate and change a teach program by moving an axis to a teach position with a manual feed such as jog feed, it is necessary to perform preparation of the teach operation such as selecting a teach program and moving a cursor to a block where teaching is performed in a program, and when there is a mistake in these operations, an unexpected operation may be performed during executing of the teach program, and machines may collide with each other, or a machine may collide with a workpiece. In particular, in a numerical controller having a multi system control function that performs control of multiple independent mechanism with the single controller, in addition to the above, it is necessary to select a system corresponding to a mechanism where teaching is performed, and accordingly, the problem of the error of the operation in the preparation becomes more serious.

In a case where it is necessary to perform may teach operations, the teaching work may not be performed efficiently due to the operation performed in the preparation. As one of means for solving these problems, for example, JP 2010-131705 A discloses a technique for allocating identification information to each of the multiple mechanism units, and allowing an operator to select a mechanism unit which is to be operated on a teach display board. JP 2010-052106 A discloses a technique for operating in accordance with a teaching given by a teach apparatus only when a unique key is inserted into a control target device.

However, the techniques disclosed in JP 2010-131705 A, JP 2010-052106 A are techniques for identifying the teach target, and in order to actually perform the teach operation, it is necessary to perform "selection of a teach program" and "movement of a cursor to a block where teaching is performed in the program", and the problem that the time is consumed for this operation cannot be solved.

In a case where the teach target is further divided into multiple control mechanisms and systems, it is necessary to select a control mechanism and a system in the teach target, and the problem that the time is consumed for this operation cannot be solved. Further, in order to identify the teach target, it is necessary to have identification information and additional devices such as a camera and a key.

SUMMARY OF THE INVENTION

Therefore, it is an object of the present invention to provide a numerical controller capable of reducing a work time for selecting a teach target when there are many teach targets in teach operation.

According to the present invention, there is provided a numerical controller including an automatic display unit of a teach program for moving an axis to a teach point by manual feed and performing teach operation to set a plurality of positions as teach points, and the numerical controller including the automatic display unit of the teach program includes: a manual movement axis monitor unit configured to monitor whether there is an axis moved by manual feed; a teach target program selection and determination unit configured to select and determine a teach program controlling the axis; and a teach block selection and determination unit configured to select and determine a teach point from a movement direction of the axis, and selecting and determining, as a teach block, a block in the teach program in which the teach point is an end point.

The numerical controller including the automatic display unit of the teach program may further include a teach target system switch unit, when the manual movement axis monitor unit detects a moving axis, the teach target system switch unit identifying and switching a system to which the axis belongs, and the teach target program selection and determination unit may select and determine a teach program controlling the axis in the system switched by the teach target system switch unit.

The system that can be switched by the teach target system switch unit may be a system to which the axis belongs that the axis acts on.

The numerical controller may further include a display device for teach setting, and the display device may display the teach program and move a cursor to the teach block to display the cursor.

The manual movement axis monitor unit may perform monitoring just like manual feed operation even in a case where the axis is moved by external force in a state where an excitation of a servo amplifier driving the axis is off.

The manual movement axis monitor unit may perform monitor operation even in a case where a movement command is given in a machine lock state in which a machine actually does not move.

The manual movement axis monitor unit may select and determines, as a teaching symmetrical axis, the axis selected with a signal or a selection screen.

In a case where there are a plurality of extracted programs, the teach target program selection and determination unit may select and determine a program which is most frequently used.

In a case where there are a plurality of extracted programs, the teach target program selection and determination unit may select and determine a program that is used last.

In a case where there are a plurality of extracted programs, the teach target program selection and determination unit may display a program which is most frequently used or a program which is used last as a teach program of which selection and determination probability is high on a selection and determination screen.

In a case of a state where a program does not exist, the teach target program selection and determination unit may newly generate a program.

In a case where there are a plurality of extracted blocks, the teach block selection and determination unit may select and determine a block in which a teach point is changed for a largest number of times.

In a case where there are a plurality of extracted blocks, the teach block selection and determination unit may select and determine a teach point where teaching is performed most recently.

In a case where there are a plurality of extracted blocks, the teach block selection and determination unit may display a block in which a teach point is changed for a largest number of times or a teach point where teaching is performed most recently as a teach point of which selection and determination probability is high on a selection and determination screen.

The present invention has the above configuration, and when an axis where teaching is to be performed is moved in a teach point direction by manual feed, the program selection and determination and the cursor movement to the teach point in the teach program are automatically executed. In a case where teach operation is performed with multi system control having many teach targets, the system switch is also automatically executed, and therefore, this reduces the work time that it takes to select a system where teaching is performed, select a teach program, and move the cursor to the teach point, and this can also reduce the probability of machine collision due to erroneous program operation and erroneous operation such as damage of a workpiece. In addition, by reducing the time it takes to generate a teach program, the time it takes to perform the teach operation can also be reduced.

BRIEF DESCRIPTION OF THE DRAWINGS

The above and other objects and the features of the present invention will become clear from the explanation about the following embodiment with reference to appended drawings. Among these drawings.

DETAILED DESCRIPTION OF THE PREFERRED EMBODIMENTS

Hereinafter, an embodiment of the present invention will be explained together with drawings. First, an overview of the present invention will be explained.

In the present invention, in order to solve the problems associated with conventional techniques, whether there is an axis (servo motor) moving by manual feed or external force is monitored, and in a case where there is such axis (servo motor), a teach program to which the axis belongs is extracted. In a case where a multi system control function is used, switching to the system to which the axis belongs is performed, and a teach program to which the axis belongs is extracted in the switched system.

Further, a teach point is selected and determined from the movement direction of the axis, and the cursor is moved to the block where the teach point is the end point, or a selection and determination screen of multiple teach point candidates is displayed, and the operator is allowed to make selection and determination.

The automatic selection and determination processing in a case where there is an axis movement caused by manual feed, or external force performed with the numerical controller of the present invention will be explained with reference to FIGS. 1A and 1B. The following explanation will be made on the basis of an example in a case where the multi system control function is used.

Figure 1A:
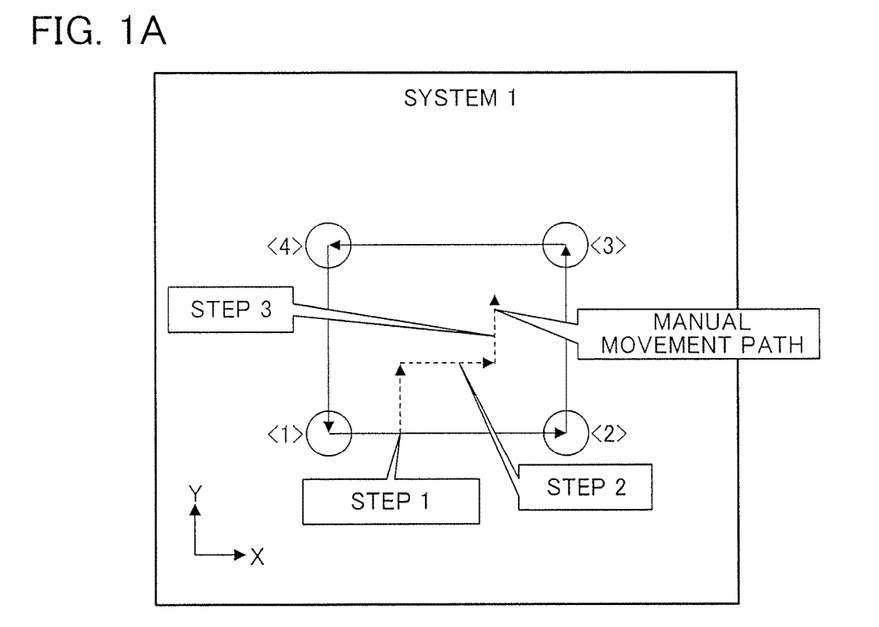
FIGS. 1A and 1B are drawings illustrating an example of a teach operation of an embodiment of the present invention.
Figure 1B:
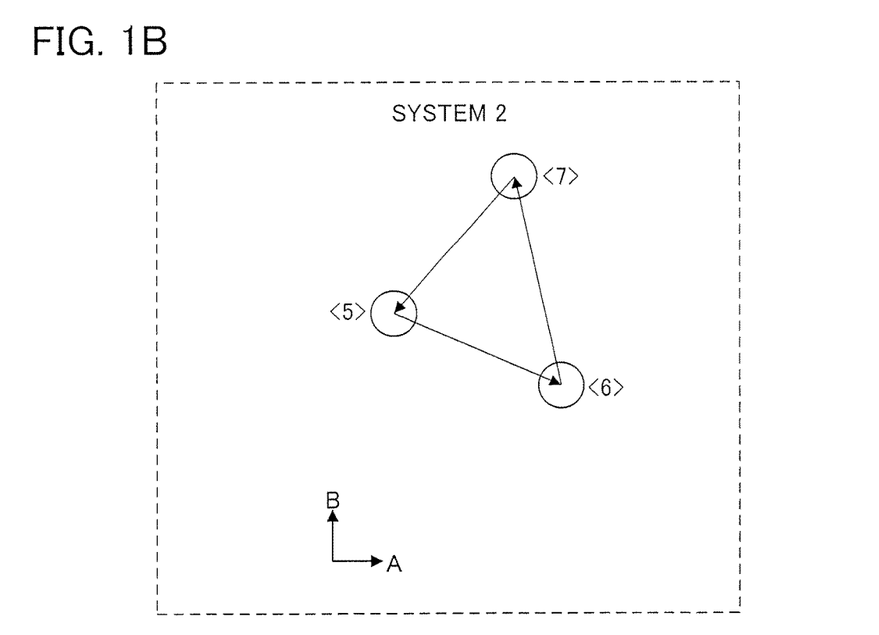

FIGS. 1A and 1B illustrate an example where teach operation is performed with manual feed in the system 1 when the multi system control function of the system 1 and the system 2 is used. When the teach operation is performed with the manual feed in the system 1 during the teach operation mode, the numerical controller of the present embodiment identifies uses a manual movement axis monitor unit to identify the movement axis moved by the teach operation at first. Subsequently, on the basis of the identified movement axis, a teach target system switch unit selects the system to which the movement axis belongs (the system 1 in FIG. 1A), and adopts the system as a teach target system.

Subsequently, a teach target program selection and determination unit automatically selects the program controlling the teach target system as the teach program, or displays a teach program selection and determination screen of programs of candidates of teach programs to the operator and executes the selection and determination operation. Then, on the basis of the manual movement path of the movement axis with the teaching operation, a teach block selection and determination unit automatically moves the cursor to the command block associated with the teach point, or displays a selection and determination screen of teach point candidates (<1> to <4> in the figure) to the operator, and moves the cursor to the corresponding command block after the selection and determination operation performed by the operator.

In the following explanation, the operation of each of the above function units will be explained using the teach operation of FIGS. 1A and 1B as an example.

Figure 2:
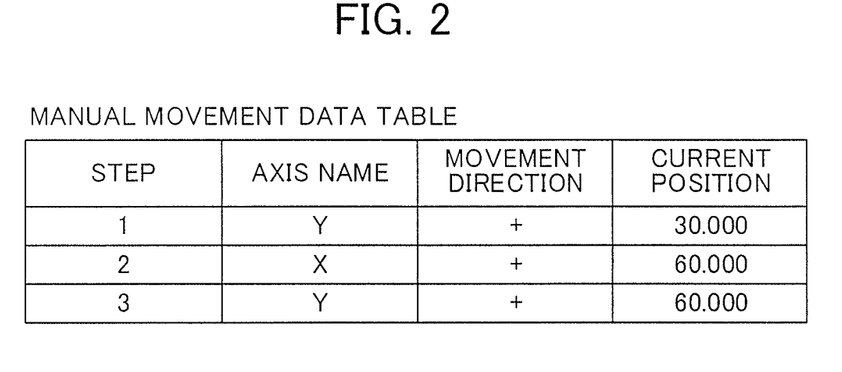
FIG. 2 is an example of a manual movement data table according to the embodiment of the present invention.

During the mode in which the teach operation is performed, the manual movement axis monitor unit monitors the positions of the servo motors of all the axes as to whether there is any servo motor moving with manual feed or external force. In a case where there is an axis that changes with respect to the previous position, the axis number (axis name) and the movement direction are recorded to a manual movement data table provided on a memory (not shown). FIG. 2 is an example of information about a movement axis recorded to the manual movement data table when the teach operation is performed as shown in FIGS. 1A and 1B.

In a case where an axis that is manually fed when the operator operates the operation board and the like and an axis is moved by external force in a state where the excitation of the servo amplifier for driving the axis is off, the manual movement axis monitor unit may monitor the movement of the axis as the teach operation, or may monitor, as the teach operation, a case where a movement command is given in a machine lock state in which the machine does not actually move. Alternatively, all the movement axes may be monitored, or a particular axis selected by a signal or a selection screen may be monitored as the teaching symmetrical axis.

Figure 3:
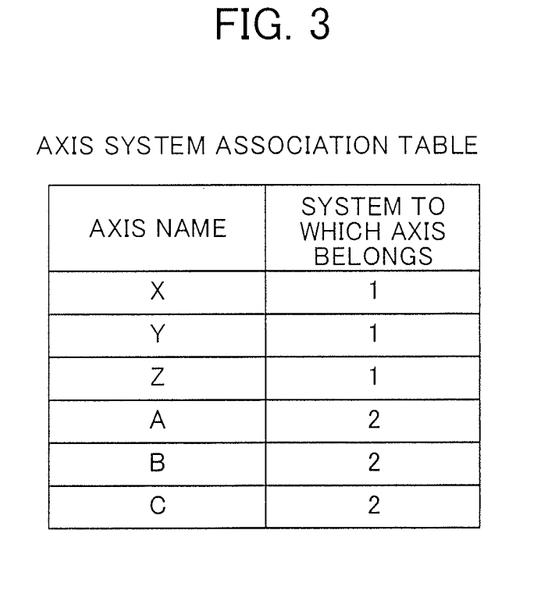
FIG. 3 is an example of an axis system association table according to the embodiment of the present invention.

The teach target system switch unit identifies the system to which the movement axis recorded in the manual movement data table belongs by referring to the axis system association table which is set in a memory (not shown) in advance, and adopts the system as the teach target system, and switches to the teach target system. FIG. 3 is an example of an axis system association table according to the present embodiment. In the present embodiment, since the movement axis is the X axis to Y axis, and therefore, the teach target system can be determined to be the system 1 by referring to the axis system association table of FIG. 3.

Figure 4:
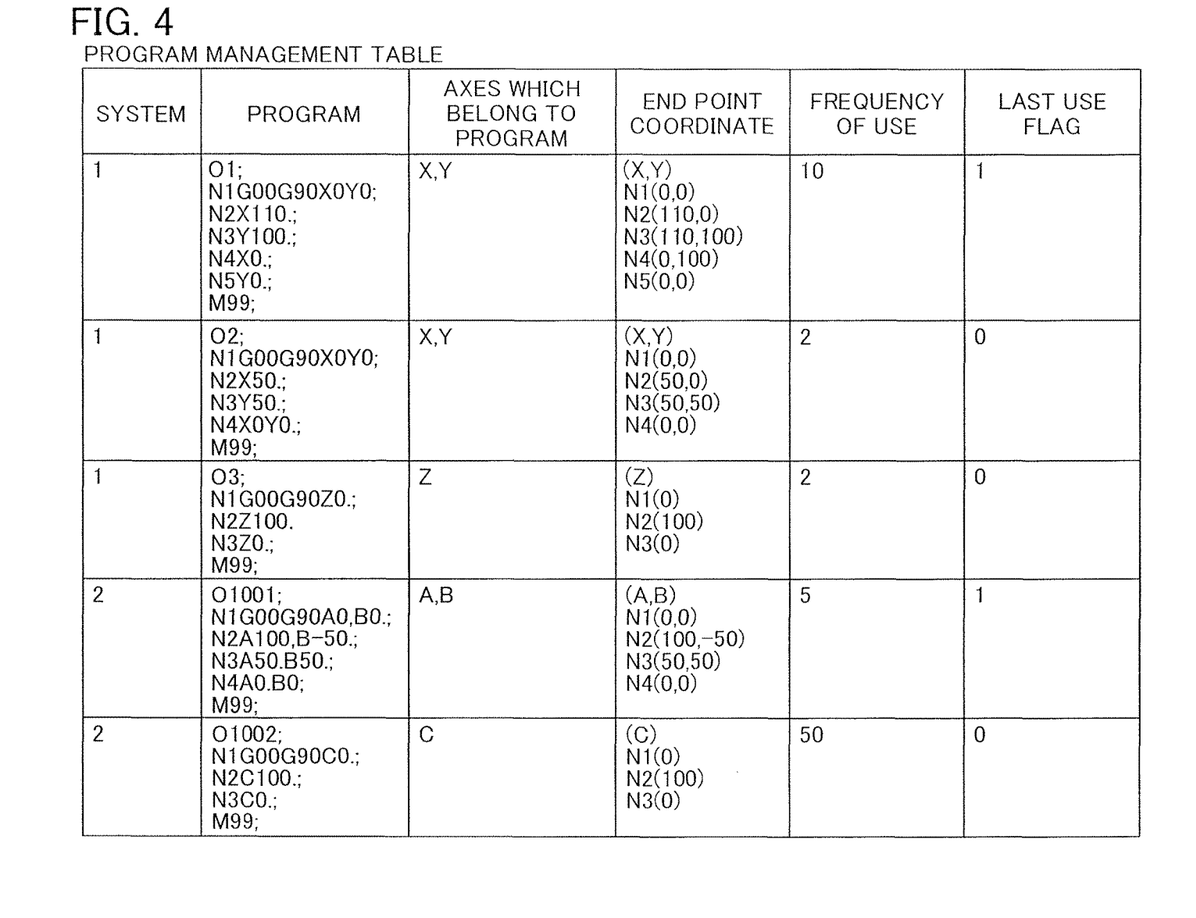
FIG. 4 is an example of a program management table according to the embodiment of the present invention.

The teach target program selection and determination unit refers to the program management table stored in the memory, and selects and determines the program to which the movement axis belongs, and finds the beginning. FIG. 4 is an example of a program management table according to the present embodiment. For each system, the program management table includes a program, axes which belongs to the program, the end point coordinate of each axis when each block of the program is executed, the frequency of the use of the program, and an item of a last use flag indicating whether the program is a program that is executed last, and for the selection and determination as the teach program, the frequency of the use and the last use flag are used for the determination of the program selection and determination. In the present embodiment, a program of the system 1 to which the X axis and the Y axis belongs and that has already executed at the top is selected and determined as the teach program.

Figure 5A:
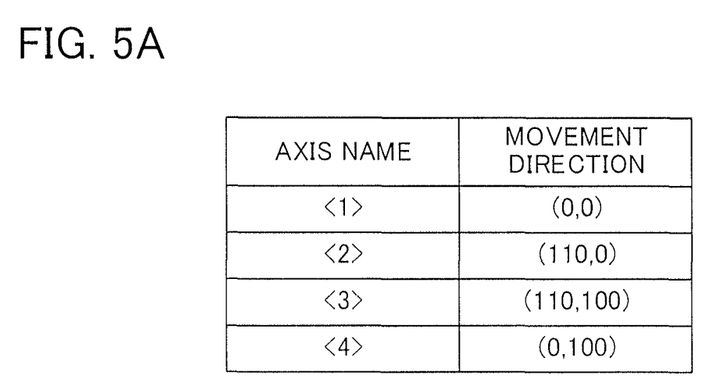
FIGS. 5A and 5B are examples of teach point candidates according to the embodiment of the present invention.
Figure 5B:
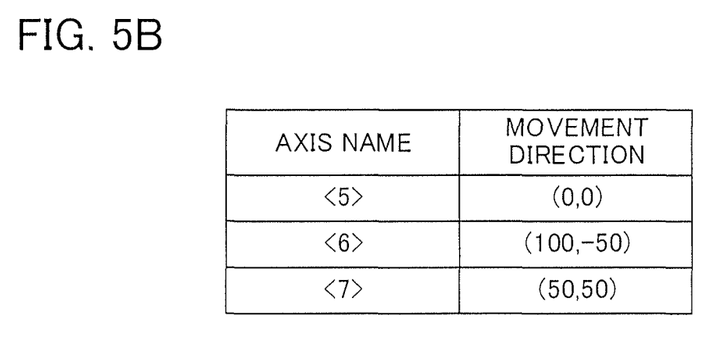

The teach block selection and determination unit refers to the program management table, and determines to which teach point candidate the movement axis is approaching from the information about the teach point candidate of the teach program selected and determined by the teach target program selection and determination unit. In the present embodiment, the teach point candidates of the points <1> to <4> are extracted from the program management table as shown in FIG. 5A. Then, it is understood that, with the teach operation in step 1 as shown in FIG. 1A, the movement axis approaches the points <3>, <4>, and with the teach operation in step 2, the movement axis approaches the points <2>, <3>, and with the teach operation in step 3, the movement axis approaches the points <3>, <4> again. As described above, in the teach operation, the movement axis is brought closer to the point <3> for many times, and therefore, the point <3> is selected and determined as the teach point, and the cursor is moved to N3 block of the program O1 in which the end point is the point <3>(110, 100).

Figure 6A:
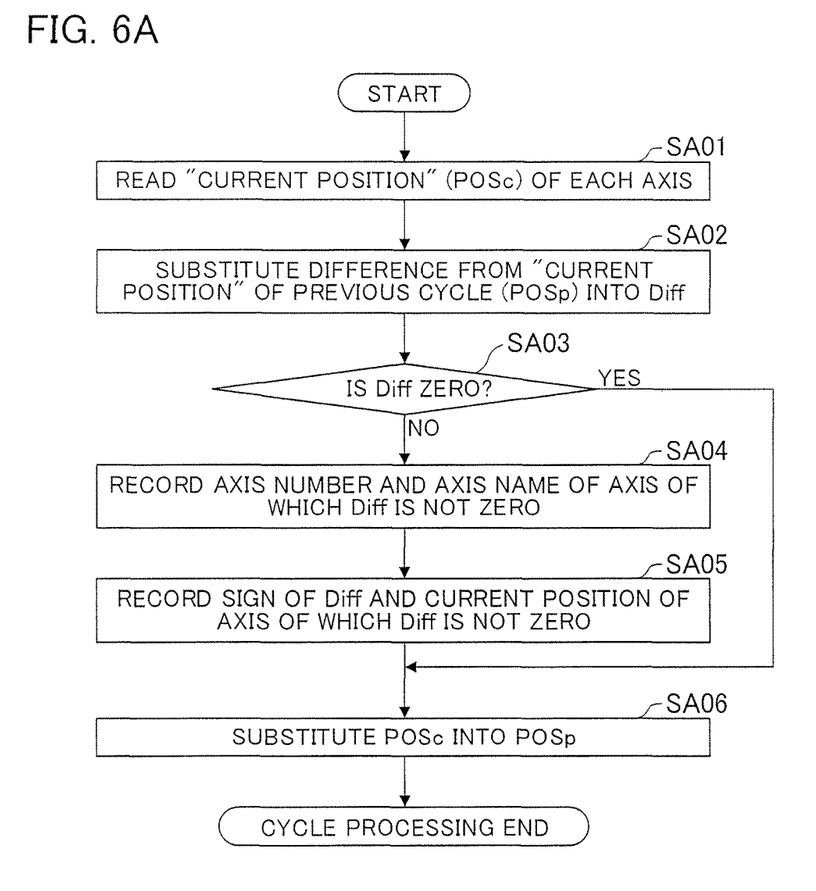
FIGS. 6A and 6B are flowcharts of manual movement axis monitor processing according to the embodiment of the present invention.

FIG. 6A is a flowchart of manual movement axis monitor processing executed by the manual movement axis monitor unit.

Figure 6B:
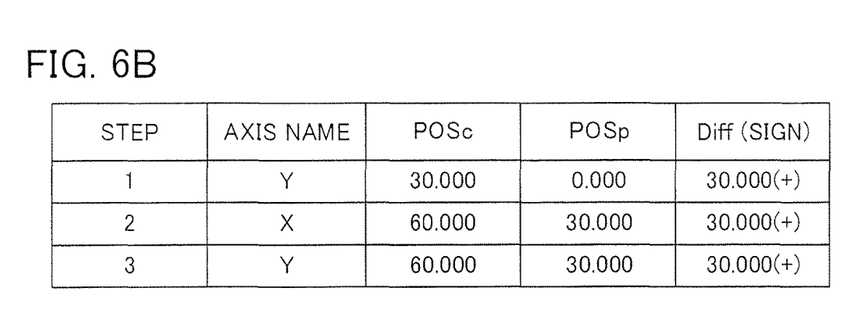

This processing is executed on every monitor cycle of the manual movement axis monitor unit. In the explanation about this flowchart, POSc denotes the current position of each axis in the monitor cycle of the manual movement axis monitor unit, POSp denotes a position one cycle before the monitor cycle of each axis, and Diff denotes the sign of the movement direction and the amount of movement of each axis (POSC-POSp). The table as shown in FIG. 6B is made by making a table from the values of POSp, POSc, Diff of the movement of the movement axis in each step in the teach operation as shown in FIGS. 1A and 1B.

[Step SA01]
The current position (POSc) of each axis is read from the servo motor of the axis and the like.

[Step SA02]
A difference Diff between the current position obtained in step SA01 and the "current position" of the previous cycle stored on the memory (POSp) is calculated.

[Step SA03]
A determination is made as to whether the difference Diff of each axis calculated in step SA02 is zero or not. In a case where the differences Diff of all the axes are zero, step SA06 is subsequently performed, and if not, step SA04 is subsequently performed.

[Step SA04]
With regard to the axis of which difference Diff is not zero, the axis number and the axis name thereof are recorded to the manual movement data table.

[Step SA05]
With regard to the axis of which difference Diff is not zero, the sign of Diff and the current position are recorded to the manual movement data table.

[Step SA06]
POSc is substituted into POSp, and the manual movement axis monitor processing in this cycle is terminated.

Figure 7:
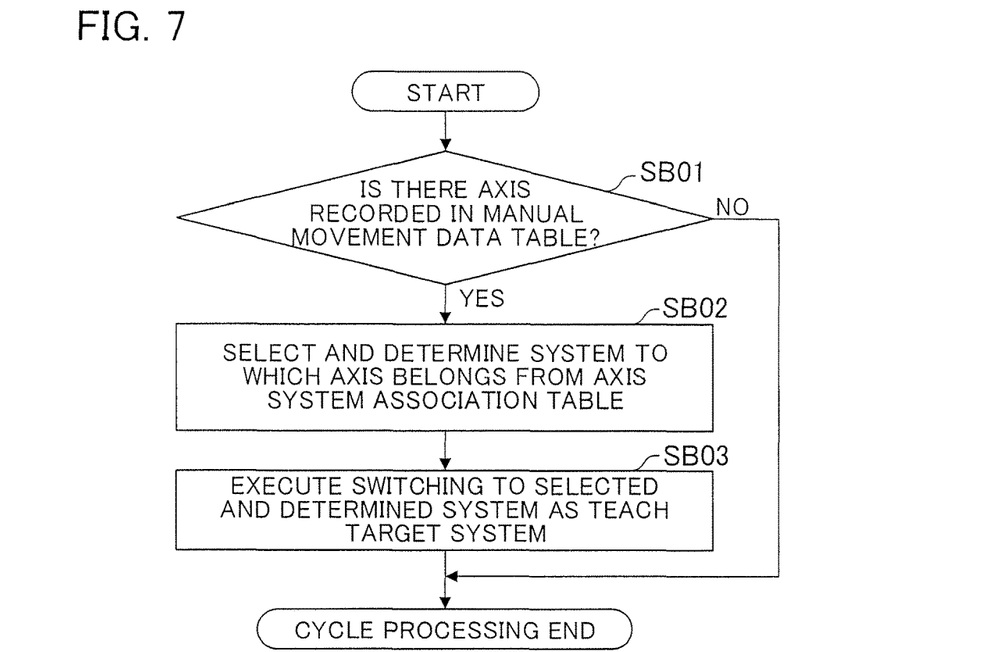
FIG. 7 is a flowchart of teach target system switch processing according to the embodiment of the present invention.

FIG. 7 is a flowchart of teach target system switch processing executed by the teach target system switch unit.

[Step SB01]
A determination is made as to whether there is an axis recorded in the manual movement data table. In a case where the axis exits, step SB02 is subsequently performed, and in a case where the axis does not exist, the processing of this cycle is terminated.

[Step SB02]
The axis recorded in the manual movement data table is looked up in the axis system association table, and the system to which the axis belongs is selected and determined as the teach target system.

[Step SB03]
Switching to the teach target system selected and determined in step SB02 is executed.

Figure 8:
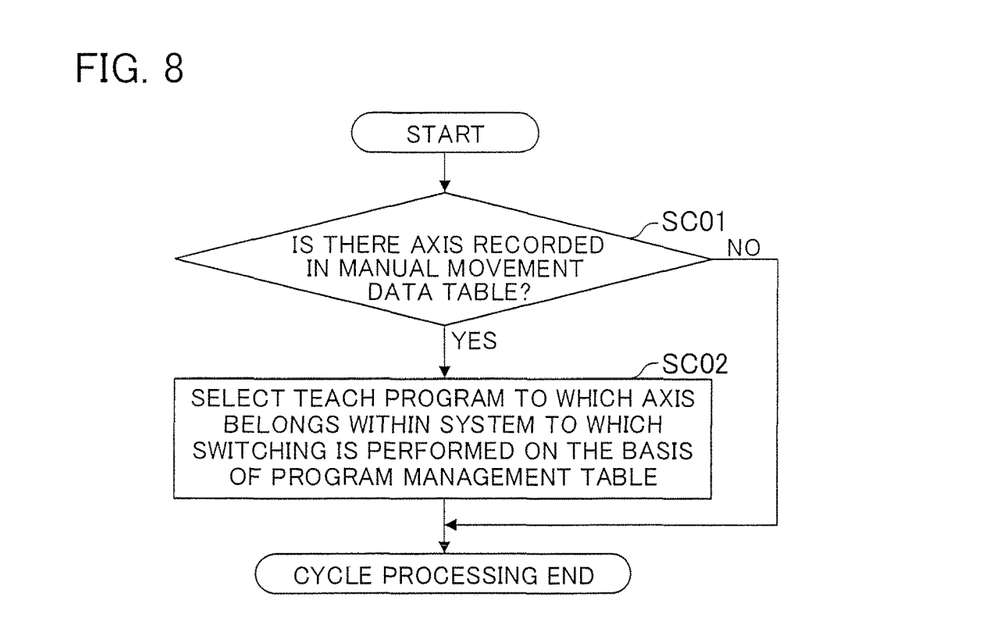
FIG. 8 is a flowchart of teach target program selection and determination processing according to the embodiment of the present invention.

FIG. 8 is a flowchart of teach target program selection and determination processing executed by the teach target program selection and determination unit.

[Step SC01]
A determination is made as to whether there is an axis recorded in the manual movement data table. In a case where the axis exists, step SC02 is subsequently performed, and in a case where the axis does not exist, the processing of this cycle is terminated.

[Step SC02]
With regard to the axis recorded in the manual movement data table, a teach program to which the axis belongs in the system switched by the teach target system switch processing on the basis of the program management table is selected. In a case where a selection is made with the frequency of the use of the teach program, the program of which "frequency of the use" is the highest is selected, or in a case where the last-used program is selected, the program of which "last use flag" is one is automatically selected and determined, or programs are displayed on the selection and determination screen as teach programs of which selection and determination probabilities are high, and the manual selection and determination operation is executed. It should be noted that the "last use flag" is set to one after the teach program is used and the teach operation is executed. The "last use flags" of the programs to which the axes other than that belong are set to zero.

Figure 9:
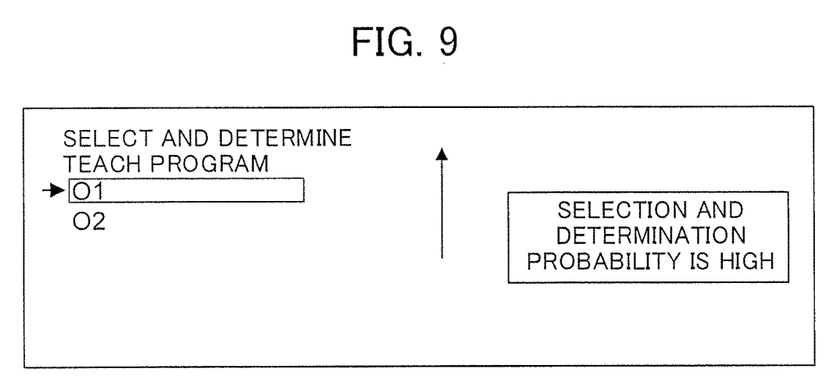
FIG. 9 is an example of teach target program selection and determination screen according to the embodiment of the present invention.

FIG. 9 is an example of a teach program selection and determination screen displayed in a case where an operator is allowed to select a teach program in step SC02 of the flowchart of FIG. 8. In the example of FIG. 9, the teach programs to which the axis belongs in the system are arranged according to the order of the selection and determination probability on the basis of information such as the frequency of the use, the last use flag, or the like, and the teach programs are displayed in the descending order of the selection and determination probability. The operator can select a teach program of the teach target by seeing the selection and determination screen.

Figure 10:
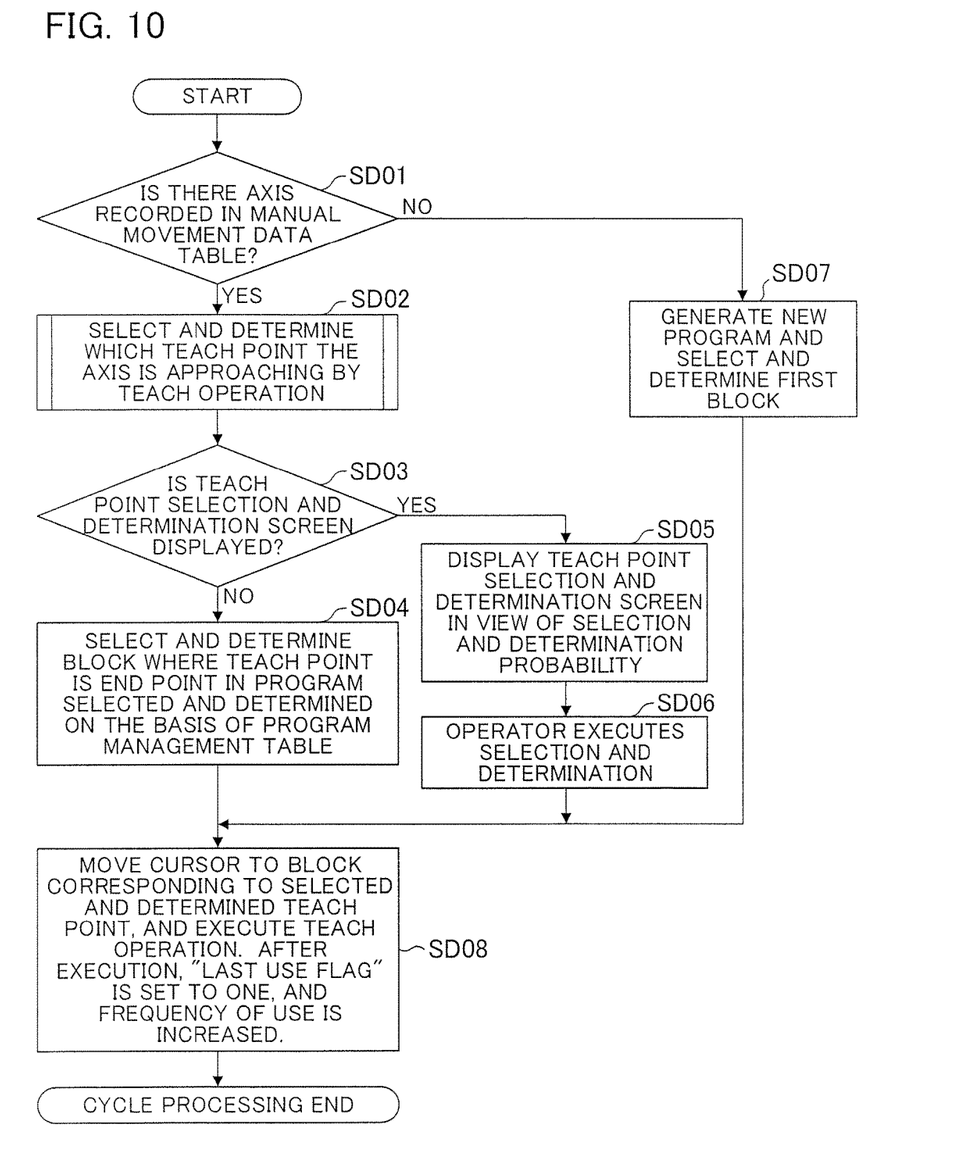
FIG. 10 is a flowchart of teach block selection and determination processing according to the embodiment of the present invention.

FIG. 10 is a flowchart of teach block selection and determination processing executed by the teach block selection and determination unit.

[Step SD01]

A determination is made as to whether there is an axis recorded in the manual movement data table. In a case where the axis exists, step SD02 is subsequently performed, and in a case where the axis does not exist, step SD07 is subsequently performed.

[Step SD02]

A teach point to which the axis is approaching by the teach operation is selected and determined in teach point selection and determination processing explained later.

[Step SD03]

A determination is made as to whether a teach point selection and determination screen is to be displayed or not. In a case where a setting is such that the teach point is selected and determined or in a case where the teach points cannot be narrowed down to one, step SD05 is subsequently performed, and if not, step SD04 is subsequently performed.

[Step SD04]

A block where the teach point is the end point in the teach program selected and determined is selected and determined on the basis of the program management table. When the selection and determination are finished, step SD08 is subsequently performed.

[Step SD05]

A teach point selection and determination screen in view of selection and determination probability is displayed.

[Step SD06]

Selection and determination operation is executed by the operator. When the selection and determination operation is finished, step SD08 is subsequently performed.

[Step SD07]

A teach program is newly generated, and the first block is selected and determined, and step SD08 is subsequently performed.

[Step SD08]

The cursor is moved to a block associated with the teach point selected and determined, and the teach operation is executed. After the execution, for the selected and determined teach program, the "last use flag" of the program management table is set to one, and the frequency of the use is increased.

Figure 11:
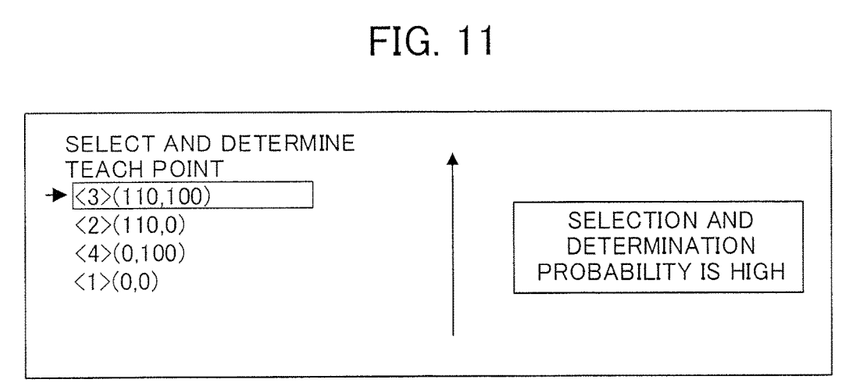
FIG. 11 is an example of teach block selection and determination screen according to the embodiment of the present invention.

FIG. 11 is an example of a teach point selection and determination screen displayed in a case where the operator is allowed to select a teach point in step SD06 of the flowchart of FIG. 10. In the example of FIG. 11, the teach point candidates in the teach program are arranged in the order of the selection and determination probability on the basis of the information such as the number of times the axis approaches in the teach operation, and the teach point candidates are displayed in the descending order of the selection and determination probability. The operator can select a teach point by seeing the selection and determination screen.

The teach point selection and determination processing executed in step SD02 in the flowchart of FIG. 10 will be explained with reference to FIGS. 12 to 14.

FIGS. 12A to 14 are tables made from a position relationship between movement of each axis (X axis, Y axis) by teach operation and the point <1> to the point <4> which are the positions (teach point candidates) after the axis movement by each block command of the teach program in each step of the teach operation as shown in FIG. 1.

Figure 12A:
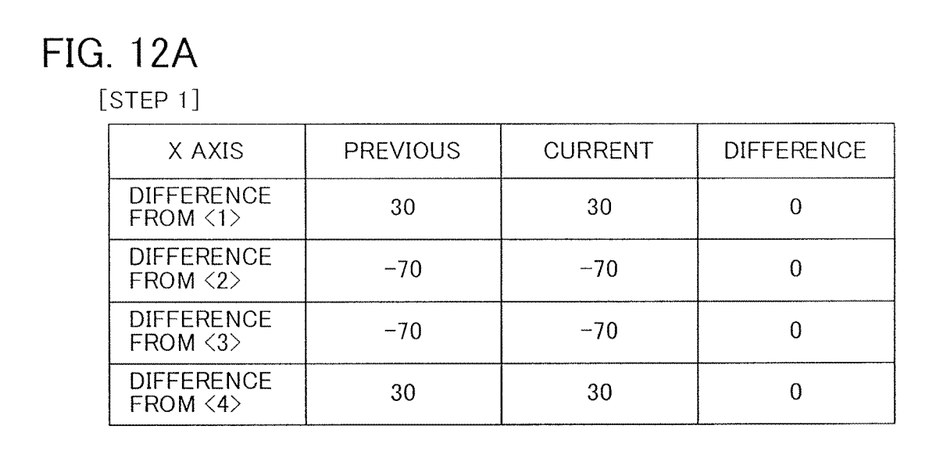
FIGS. 12A and 12B are figures for explaining teach point selection and determination processing according to the embodiment of the present invention.
Figure 12B:
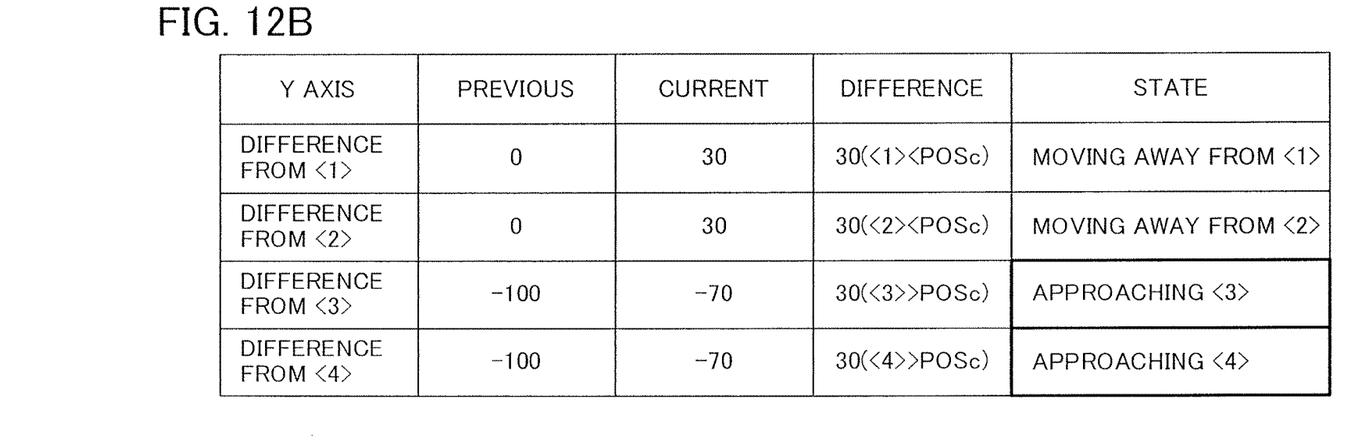

As shown in FIGS. 12A and 12B, in step 1 of the teach operation in FIG. 1, only the position of Y axis moves in a direction away from the points <1>, <2> and in a direction closer to the points <3>, <4>.

Figure 13A:
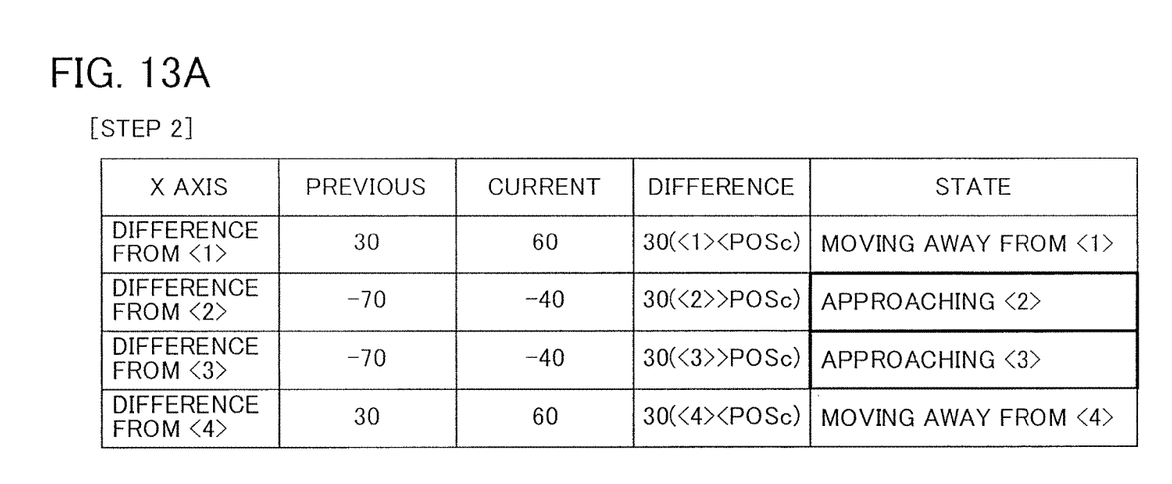
FIGS. 13A and 13B are figures for explaining teach point selection and determination processing according to the embodiment of the present invention.
Figure 13B:
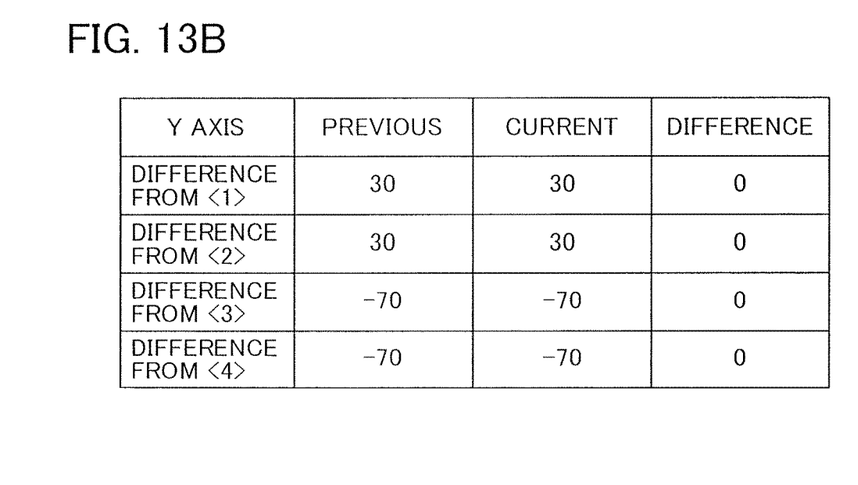

As shown in FIGS. 13A and 13B, in step 2 of the teach operation in FIG. 1, only the position of X axis moves in a direction away from the points <1>, <4> and in a direction closer the points <2>, <3>.

Figure 14A:
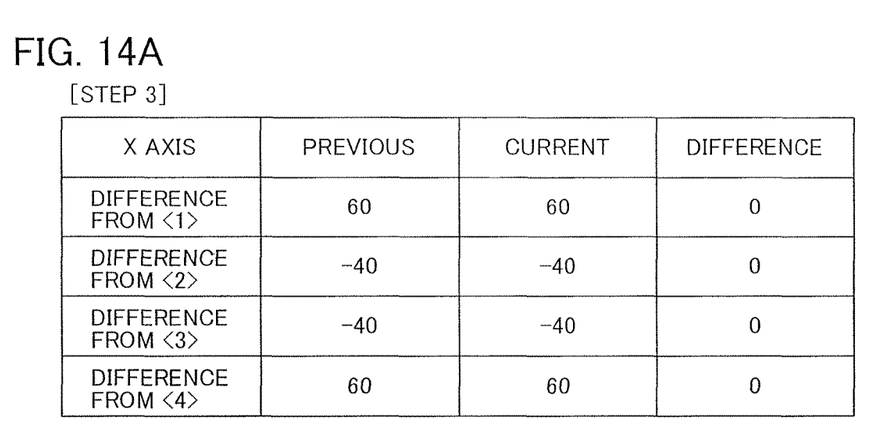
FIGS. 14A and 14B are figures for explaining teach point selection and determination processing according to the embodiment of the present invention.
Figure 14B:
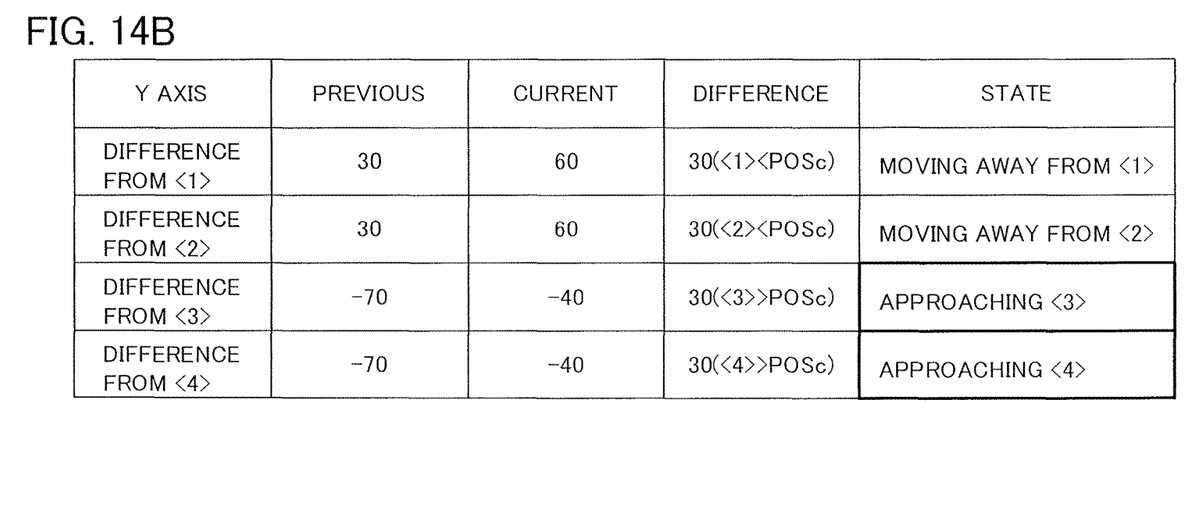

Further, as shown in FIGS. 14A and 14B, in step 3 of the teach operation in FIG. 1, only the position of Y axis moves in a direction away from the points <1>, <2> and in a direction closer the points <3>, <4>.

In the present embodiment, as described above, in every step of each teach operation, a position relationship between the position of the axis by the teach operation and the position of the teach point candidate is derived, and the teach point candidate which the axis approaches for the highest number of times is selected and determined as the teach point.

As described above, an embodiment of the present invention has been explained, but the present invention is not limited to the example of the above embodiment, and the present invention can be carried out in other aspects by applying changes as necessary.

For example, the teach operation in the numerical controller that performs multi system control has been explained as an example in the explanation about the above embodiment, but the effects of the present invention can be achieved even when the present invention is applied to the teach operation in a case where multiple programs are used by a single system. In this case, it is not necessary to have the teach target system switch unit and management of information about the system, and in the teach operation mode, when the existence of the movement axis is confirmed in the manual movement axis monitor processing, the teach target program selection and determination processing is executed, and thereafter, the teach block selection and determination processing is executed.

The invention claimed is:

1. A numerical controller including an automatic display unit of a teach program for moving an axis to a teach point by manual feed and performing teach operation to set a plurality of positions as teach points, the numerical controller including the automatic display unit of the teach program comprising:

a manual movement axis monitor unit configured to monitor whether there is an axis moved by manual feed;

a teach target program selection and determination unit configured to select and determine a teach program controlling the axis; and a teach block selection and determination unit configured to select and determine a teach point from a movement direction of the axis, and selecting and determining, as a teach block, a block in the teach program in which the teach point is an end point, wherein when an axis where teaching is to be performed is moved in a teach point direction by manual feed, the selection and determination of the teach program and a cursor movement to the teach point in the teach program are automatically executed.

2. The numerical controller including the automatic display unit of the teach program according to claim 1, further comprising a teach target system switch unit, when the manual movement axis monitor unit detects a moving axis, the teach target system switch unit identifying and switching a system to which the axis belongs, wherein the teach target program selection and determination unit selects and determines a teach program controlling the axis in the system switched by the teach target system switch unit.

3. The numerical controller including the automatic display unit of the teach program according to claim 2, wherein the system that can be switched by the teach target system switch unit is a system to which the axis belongs that the axis acts on.

4. The numerical controller including the automatic display unit of the teach program according to claim 1, further comprising a display device for teach setting, wherein the display device displays the teach program and moves a cursor to the teach block to display the cursor.

5. The numerical controller including the automatic display unit of the teach program according to claim 1, wherein the manual movement axis monitor unit performs monitoring just like manual feed operation even in a case where the axis is moved by external force in a state where an excitation of a servo amplifier driving the axis is not driving the axis.

6. The numerical controller including the automatic display unit of the teach program according to claim 1, wherein the manual movement axis monitor unit performs monitor operation even in a case where a movement command is given in a machine lock state in which a machine actually does not move.

7. The numerical controller including the automatic display unit of the teach program according to claim 1, wherein the manual movement axis monitor unit selects and determines, as a teaching symmetrical axis, the axis selected with a signal or a selection screen.

8. The numerical controller including the automatic display unit of the teach program according to claim 1, wherein in a case where there are a plurality of extracted programs, the teach target program selection and determination unit selects and determines a program which is most frequently used.

9. The numerical controller including the automatic display unit of the teach program according to claim 1, wherein in a case where there are a plurality of extracted programs, the teach target program selection and determination unit selects and determines a program that is used last.

10. The numerical controller including the automatic display unit of the teach program according to claim 1, wherein in a case where there are a plurality of extracted programs, the teach target program selection and determination unit displays a program which is most frequently used or a program which is used last as a teach program of which selection and determination probability is high on a selection and determination screen.

11. The numerical controller including the automatic display unit of the teach program according to claim 1, wherein in a case of a state where a program does not exist, the teach target program selection and determination unit newly generates a program.

12. The numerical controller including the automatic display unit of the teach program according to claim 1, wherein in a case where there are a plurality of extracted blocks, the teach block selection and determination unit selects and determines a block in which a teach point is changed for a largest number of times.

13. The numerical controller including the automatic display unit of the teach program according to claim 1, wherein in a case where there are a plurality of extracted blocks, the teach block selection and determination unit selects and determines a teach point where teaching is performed most recently.

14. The numerical controller including the automatic display unit of the teach program according to claim 1, wherein in a case where there are a plurality of extracted blocks, the teach block selection and determination unit displays a block in which a teach point is changed for a largest number of times or a teach point where teaching is performed most recently as a teach point of which selection and determination probability is high on a selection and determination screen.

* * * * *